(12) United States Patent
Ojha

(10) Patent No.: US 11,727,132 B2
(45) Date of Patent: Aug. 15, 2023

(54) ACTIVITY-BASED CONTENT OBJECT ACCESS PERMISSIONS

(71) Applicant: Box, Inc., Redwood City, CA (US)

(72) Inventor: Alok Ojha, Newark, CA (US)

(73) Assignee: Box, Inc., Redwood City, CA (US)

( * ) Notice: Subject to any disclaimer, the term of this patent is extended or adjusted under 35 U.S.C. 154(b) by 274 days.

(21) Appl. No.: 16/552,956

(22) Filed: Aug. 27, 2019

(65) Prior Publication Data

US 2020/0065509 A1    Feb. 27, 2020

Related U.S. Application Data

(60) Provisional application No. 62/723,314, filed on Aug. 27, 2018.

(51) Int. Cl.
*H04L 29/06* (2006.01)
*G06F 21/62* (2013.01)
(Continued)

(52) U.S. Cl.
CPC .......... *G06F 21/6218* (2013.01); *G06F 16/11* (2019.01); *G06F 21/53* (2013.01);
(Continued)

(58) Field of Classification Search
CPC .... G06F 21/6218; G06F 21/53; G06F 21/577; G06F 21/6227; G06F 2221/034;
(Continued)

(56) References Cited

U.S. PATENT DOCUMENTS 7,676,845 B2   3/2010 Thomas et al.
10,242,232 B1 *  3/2019 Hurry .................. H04L 63/107
(Continued)

OTHER PUBLICATIONS

Deep Security, "Create anti-malware exceptions", user guide, (last modified on Nov. 24, 2021).
(Continued)

*Primary Examiner* — Joseph P Hirl
*Assistant Examiner* — Chi D Nguy
(74) *Attorney, Agent, or Firm* — Vista IP Law Group, LLP

(57) ABSTRACT

Methods, systems and computer program products for content management systems. The techniques of the methods, systems and/or computer program products automatically determine activity-based content object access permissions and/or make a recommendation of activity-based content object access permissions. A machine learning model is formed from observations of user interactions over a plurality of content objects. The model is continually updated based on ongoing observation and analysis of user interaction events. When a collaborative relationship is formed between an invitor and one or more invitees, the activity-based permissions model is accessed to determine a set of access permissions to assign to the collaborative relationship. A single collaborative relationship may cover many collaboration objects. In some cases, a set of access permissions are automatically assigned to the collaborative relationship. In other cases, a set of access permissions is presented to the invitor as a recommendation. A user can accept or reject any recommendation.

20 Claims, 10 Drawing Sheets

(51) Int. Cl.
*G06F 16/11* (2019.01)
*G06F 21/53* (2013.01)
*H04L 9/40* (2022.01)
*H04L 67/06* (2022.01)
*G06N 20/00* (2019.01)
*G06N 5/04* (2023.01)
*G06F 21/57* (2013.01)
*H04L 67/55* (2022.01)

(52) U.S. Cl.
CPC ........ *G06F 21/577* (2013.01); *G06F 21/6227* (2013.01); *G06N 5/04* (2013.01); *G06N 20/00* (2019.01); *H04L 63/102* (2013.01); *H04L 63/105* (2013.01); *H04L 63/107* (2013.01); *H04L 63/1416* (2013.01); *H04L 63/1466* (2013.01); *H04L 67/06* (2013.01); *H04L 67/55* (2022.05); *G06F 2221/034* (2013.01)

(58) Field of Classification Search
CPC .......... G06F 16/11; G06N 20/00; G06N 5/04; H04L 63/102; H04L 63/105; H04L 63/107; H04L 63/1416; H04L 63/1466; H04L 67/06; H04L 67/26
See application file for complete search history.

(56) References Cited

U.S. PATENT DOCUMENTS

| 2015/0100503 | A1* | 4/2015 | Lobo | G06Q 10/103 |
| | | | | 705/301 |
| 2016/0267413 | A1* | 9/2016 | Liang | G06Q 10/06313 |
| 2017/0289168 | A1* | 10/2017 | Bar | H04L 63/102 |
| 2018/0285357 | A1* | 10/2018 | Chang | G06V 20/30 |
| 2020/0007411 | A1* | 1/2020 | Arar | G06F 8/31 |

OTHER PUBLICATIONS

Chistyakov A., et al, "AI under attack", How to secure machine learning in security systems, Kaspersky Threat Research, dated Aug. 27, 2019.

Moynhian, T., "How to create PDFs with google drive for android", Apr. 5, 2016.

* cited by examiner

ACTIVITY-BASED CONTENT OBJECT ACCESS PERMISSIONS

CROSS-REFERENCE TO RELATED APPLICATION(S)

The present application claims the benefit of priority to U.S. Patent Application Ser. No. 62/723,314 titled "COLLABORATION SYSTEM SECURITY", filed on Aug. 27, 2018, which is hereby incorporated by reference in its entirety.

FIELD

This disclosure relates to content management systems, and more particularly to techniques for activity-based content object access permissions.

BACKGROUND

The emergence of content management systems, such as cloud-based content management systems, has impacted the way electronically stored content objects (e.g., files, folders, images, videos, etc.) are stored, and has also impacted the way the content objects are shared and managed. One benefit of using content management systems is the ability to securely share large volumes of content objects among trusted users (e.g., collaborators) that access shared content from a variety of user devices (e.g., smart phones, tablets, laptop computers, desktop computers, and/or other devices). In such systems, the content objects are securely shared among the users in accordance with the access permissions associated with the various combinations of content objects and users.

Collaboration activity between users that may not involve content objects is also governed by access permissions associated with the users. As such, when certain collaborative relationships (e.g., between users and content objects, between users, etc.) are established, access permissions are assigned to the entities (e.g., users, content objects, etc.) associated with the collaborative relationships to facilitate the collaboration activities that are to be performed over the entities.

In some systems, access permissions are assigned based on certain high order relationships between the entities. Specifically, consider a set of content objects that are stored as files in various folders that are arranged in hierarchies that are representative of an organizational hierarchy. For example, an enterprise might have a marketing department folder, an engineering department folder, and/or other folders that have certain files associated with (e.g., stored "in") the folders. With such a content organization scheme, members of a marketing department might be provisioned access to the files in the marketing department folder (and in any of its subfolders) by assigning a single set of permissions to the files that allow access to the files by any and all constituents of the marketing department. Furthermore, all members of an engineering department might be provisioned access to the files in the engineering department folder (and in any of its subfolders) by assigning a set of permissions to the files that allow access to the files by any and all constituents of the engineering department. As new files are created and/or otherwise added to a particular folder, each file inherits access permissions from its parent folder. As such, the mere addition of a file to a particular folder hierarchy assigns access permissions to the file without requiring user and/or administrator intervention.

This mechanism for automatic inheritance of access permissions has practical limitations, however. For example, an owner (e.g., creator) of a file might want to control the access permissions associated with the file at a level (e.g., user-specific level) that is more fine-grained than the aforementioned folder level and/or department level. Implementing such fine-grained access control demands involvement by the owner to select specific access permissions for each respective user who might collaborate over any particular content object.

Various simple models and simple user interfaces have been designed to aid a user (e.g., content object owner) in selecting user-specific permissions. In some systems, for example, a permissions selection model might support user specification of access permissions that control (e.g., allow or deny) particular actions (e.g., read, write, modify, delete, etc.) to be performed over a file, or that represent the collaborator's role (e.g., editor, viewer, etc.) as pertains to the collaboration activity.

Unfortunately, such simple models for assigning access permissions can become onerous to users of the models when the number of content objects increases, and/or when the number of collaborators over the content objects increases, and/or when the number of actions that can be performed over the content objects increases. Such simple models that rely on content owners to assign access permissions for each particular collaborative relationship (e.g., the combination of collaborator and content object) do not scale as more and more users collaborate over more and more content objects.

This is further complicated when users are associated with (e.g., employed in) different enterprises. To illustrate, consider that a design engineer in a first enterprise (e.g., a design firm) is asked to share a document with various members of a large operations department of a second enterprise (e.g., a manufacturing firm) who will perform actions over the document in accordance with their roles. For example, the manufacturing engineers in the operations department might jointly edit the document, whereas the managers, operators, and technicians in the operations department might merely view the document. Using a simple model for assigning access permissions to these various collaborative relationships, the design engineer would have to individually identify (e.g., by email address) each user from the second enterprise invited to collaborate over the document and select the user-specific access permissions (e.g., editor, viewer, etc.) for each respective invitee. Such a task is far too cumbersome.

An alternative approach might be to assign a single set of access permissions to any and all of the invitees from the second enterprise. Such an approach, however, may result in access permissions that are too permissive for some invitees, and too restrictive for other invitees. What is needed is a way to automatically assign fine-grained (e.g., user-specific) access permissions to a broad range of collaborative relationships so as to reduce or eliminate all or some of these onerous permissions assignment tasks.

SUMMARY

The present disclosure describes techniques used in systems, methods, and in computer program products for making activity-based content object access permissions assignments, which techniques advance the relevant technologies to address technological issues with legacy approaches. Furthermore, the present disclosure describes techniques used in systems, methods, and in computer program products for recommending activity-based content object access permissions. Certain embodiments are directed to technological solutions for forming an activity-based permissions model from historical content object access activity to determine a set of content object access permissions recommendations.

The disclosed embodiments modify and improve over legacy approaches. In particular, the herein-disclosed techniques provide technical solutions that address the technical problems attendant to assigning fine-grained (e.g., user-specific) access permissions to shared content objects.

The ordered combination of steps of the embodiments serve in the context of practical applications that perform steps for forming an activity-based permissions model from historical content object access activity to derive content object access permissions recommendations. As such, techniques for forming an activity-based permissions model from historical content object access activity to determine the content object access permissions recommendations overcome long standing yet heretofore unsolved technological problems associated with assigning fine-grained (e.g., user-specific) access permissions to shared content objects.

Many of the herein-disclosed embodiments for forming an activity-based permissions model from historical content object access activities involve technological solutions pertaining to technological problems that arise in the hardware and software arts that underlie content management systems. Aspects of the present disclosure achieve performance and other improvements in peripheral technical fields including (but not limited to) human-machine interfaces and management of distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
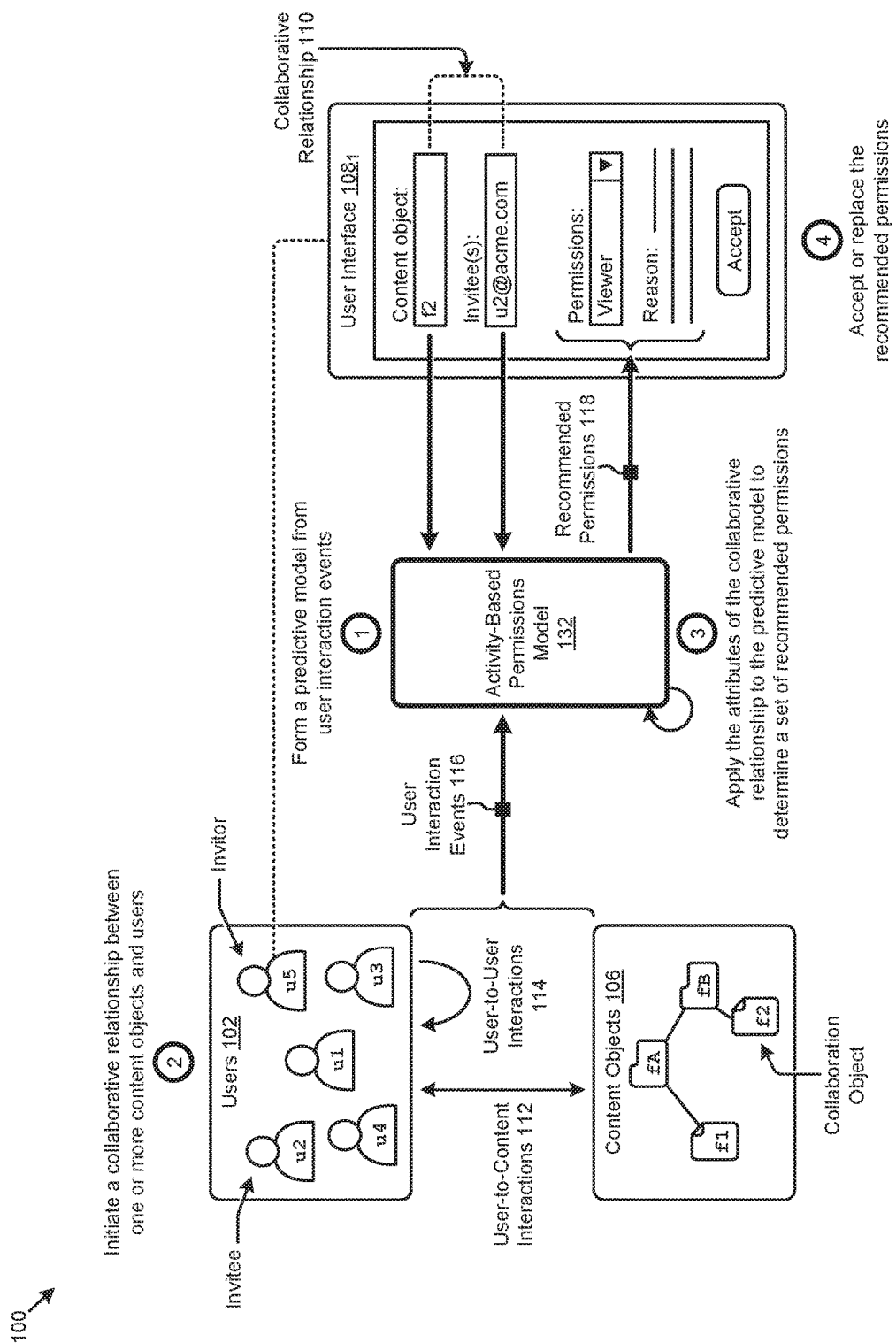
FIG. 1 illustrates a computing environment in which embodiments of the present disclosure can be implemented.

Aspects of the present disclosure solve problems associated with using computer systems for assigning fine-grained (e.g., user-specific) access permissions to shared content objects. These problems are unique to the need to assign fine-grained (e.g., user-specific) access permissions to shared content objects in the context of content management systems. Some embodiments are directed to approaches for forming an activity-based permissions model from historical content object access activity to determine the content object access permissions recommendations. The accompanying figures and discussions herein present example environments, systems, methods, and computer program products for activity-based content object access permissions.

Overview

Disclosed herein are techniques for forming an activity-based permissions model from historical content object access activity to determine the content object access permissions recommendations. In certain embodiments, such techniques are implemented in a content management system that facilitates user-to-user interactions and user-to-content interactions over a plurality of users and a plurality of content objects. Various interaction attributes associated with the interactions, including any access permissions assigned to the relationships between the interacting entities (e.g., users, content objects, etc.), are recorded at the system. The recorded interaction attributes are used to generate the activity-based permissions model. As more interaction events occur and their corresponding interaction attributes are captured, the model is updated.

When a new collaborative relationship (e.g., a new user-to-content collaborative relationship, or a new user-to-user collaborative relationship, etc.) is to be established to facilitate certain collaboration activities, the need to establish a set of access permissions is raised. In accordance with the herein disclosed techniques, the set of access permissions for the collaborative relationship is automatically determined by consulting the activity-based permissions model. As an illustrative example, consider a content owner who desires to establish a collaborative relationship to share a content object with a collaborator. In such a case, access permissions associated with the collaborative relationship between the content object and the collaborator are needed to share the content object in accordance with the content owner's desires.

Various collaboration attributes associated with the collaborative relationship are collected. Such collaboration attributes might describe various characteristics of the content owner, the collaborator, the content object, and/or other entities associated with the collaborative relationship. The collaboration attributes are organized and applied to the activity-based permissions model to determine a set of access permissions to assign to the entities of the collaborative relationship. For example, based at least in part on historical interactions between the collaborator, the content owner and other content objects, the activity-based permissions model might determine that the collaborator be assigned access permissions according to a "viewer" role. In certain embodiments, the set of access permissions are presented in a user interface as recommendations to the user (e.g., the content owner) that initiated the collaborative relationship. In certain embodiments, a user can accept or replace the recommended permissions at the user interface.

In certain embodiments, one or more reasons for the recommended permissions are generated and presented to the user.

DEFINITIONS AND USE OF FIGURES

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to forming an activity-based permissions model from historical content object access activity to determine the content object access permissions recommendations. Specifically, the figure presents a logical depiction of how the herein disclosed techniques can be used to automatically determine the content object access recommendations in a computing environment that exhibits highly active collaboration over many users and many content objects. A representative set of high order operations are also presented to illustrate how the herein disclosed techniques might be applied in computing environment 100.

The logical depiction of FIG. 1 illustrates a representative set of users (e.g., user u1, user u2, user u3, user u4, and user u5) from a plurality of users 102 that interact with each other through instances of user-to-user interactions 114. For example, a first user (e.g., an "invitor") might invite a second user (e.g., an "invitee") to collaborate on some task, and/or might request to join a group of other users. As used herein a collaborative relationship is any association between a user and another user or any association between a user and a content object. As such, in a user-to-user interaction, the collaborative relationship is between two users.

Any of users 102 may also participate in instances of user-to-content interactions 112 with various instances of content objects 106 (e.g., folder fA, folder fB, file f1, and file f2). As stated above, a collaborative relationship is any association between a user and a content object. As such, any activity that associates a particular user with a particular content object qualifies as a collaborative relationship. The collaborative relationship may include aspects pertaining to the types of actions taken by a particular user over a particular content object. As an example, a first user might create a content object (e.g., a document, photo, video, etc.) and then share the content object with other users for editing, commenting, viewing, etc. In such types of user-to-content interactions, the collaborative relationship includes specific actions taken by a user over a content object.

As earlier mentioned, such collaboration activities (e.g., user-to-content interactions 112, user-to-user interactions 114, etc.) are carried out in accordance with the access permissions associated with the various collaborative relationships between content objects 106 and users 102. The access permissions of a user often correspond to the collaboration action or access role of the user as pertains to the collaboration object. As merely examples, a first invitee might be provisioned "editor" permissions for a document and a second invitee might be provisioned "previewer" permissions for the same document. Various simple models and simple user interfaces have been designed to aid an invitor in selecting such content object access permissions for an invitee.

As shown in computing environment 100, user u5, acting as an invitor, interacts with a user interface $108_1$ to specify a collaborative relationship 110 between an invitee (e.g., user u2, as specified by an email address "u2@acme.com") and a collaboration object (e.g., file f2). As can be observed, a dropdown is presented to facilitate selection of the access permissions to assign to collaborative relationship 110. Specifically, the dropdown selects the access permissions of user u2 over file f2.

In this case, the specified permissions are represented by a "viewer" access role. Whereas such simple models may be sufficient for establishing the access permissions for a single collaborative relationship, they become onerous to users (e.g., invitors) when the number and variability of the collaborative relationships increases. For example, if user u5 were sharing file f2 with 100 other users having various access roles, user u5 would need to interact with user interface 108₁ to manually enter a permissions selection for each of the other users. The herein disclosed techniques address such issues pertaining to assigning fine-grained (e.g., user-specific) access permissions in computing environments that exhibit highly active collaboration over many users and many content objects. Specifically, the herein disclosed techniques address these issues at least in part by forming a predictive model (e.g., activity-based permissions model 132) from observed instances of user interaction events 116 (operation 1). A predictive model, as used herein, is a collection of mathematical techniques (e.g., algorithms) that facilitate determining (e.g., predicting) a set of outputs (e.g., outcomes, responses) based on a set of inputs (e.g., stimuli).

For example, activity-based permissions model 132 is a predictive model that consumes collaborative relationship attributes as inputs to predict a respective set of access permissions as outputs. The collaborative relationship attributes consumed by activity-based permissions model 132 are derived from the interaction attributes of the instances of user-to-content interactions 112 and user-to-user interactions 114 that comprise user interaction events 116. The interaction attributes of user interaction events 116 describe certain characteristics of the underlying interaction, such as the access permissions that correspond to the collaborative relationship associated with the interaction. As such, activity-based permissions model 132 is formed based at least in part on the attributes of historical collaborative relationships. As more instances of user interaction events 116 occur, and their corresponding interaction attributes are captured, activity-based permissions model 132 is updated.

Activity-based permissions model 132 is used to automatically determine sets of access permissions to assign to collaborative relationships as follows. Consider a collaborative relationship that is initiated over one or more content objects and users (operation 2). More specifically, consider the foregoing example in which user u5 interacts with user interface 108₁ to invite user u2 to collaborate over file f2. In this case, various collaboration attributes associated with collaborative relationship 110 are collected. Such collaboration attributes might describe various characteristics of the invitor (e.g., user u5), the invitee (e.g., user u2), the collaboration object (e.g., file f2), and/or other entities associated with collaborative relationship 110 and/or the initiation of collaborative relationship 110.

The collaboration attributes are organized and applied to activity-based permissions model 132 to determine a set of access permissions to recommend for the collaborative relationship (operation 3). For example, based at least in part on historical interactions between user u2 and user u5 and/or other content objects, activity-based permissions model 132 might recommend that user u2 have access permissions over file f2 in accordance with a "viewer" access role. As shown, an instance of recommended permissions 118 comprising the recommended access role (e.g., "viewer") and an associated reason for the recommendation are presented in user interface 108₁ for review by user u5. User u5 can then accept or replace (e.g., with an "editor" access role) the recommended permissions by interacting (e.g., clicking the "Accept" button) within the user interface 108₁ (operation 4). The invitation associated with collaborative relationship 110 and any interactions between user u2 and file f2 will be recorded in new instances of user interaction events 116, which instances may produce updates to activity-based permissions model 132.

Any recommended permission that is determined by the herein disclosed techniques improves computer functionality in ways that serve to reduce the demand for computer memory, reduce the demand for computer processing power, reduce network bandwidth use, and reduce the demand for intercomponent communication. Specifically, consumption of such computing resources to carry out the onerous tasks of assigning the access permissions over a wide range of numerous collaborative relationships and/or correcting the access permissions assignments that are too permissive or too restrictive is eliminated. Furthermore, the user is relieved of the onerous task of assigning access permissions to content objects.

One embodiment of techniques for recommending activity-based content object access permissions is disclosed in further detail as follows.

Figure 2:
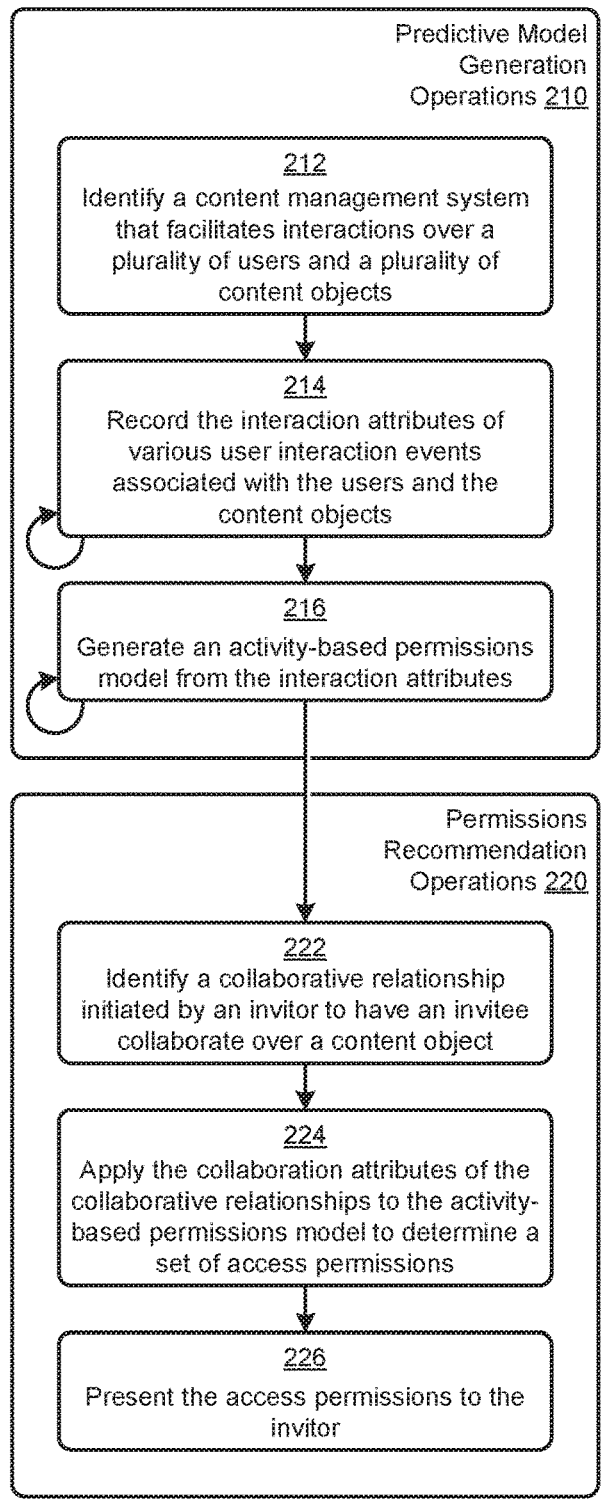
FIG. 2 depicts an activity-based content object permissions recommendation technique as implemented in systems that facilitate automatic activity-based content object access permissions generation, according to an embodiment.

FIG. 2 depicts an activity-based content object permissions recommendation technique 200 as implemented in systems that facilitate automatic activity-based content object access permissions generation. As an option, one or more variations of activity-based content object permissions recommendation technique 200 or any aspect thereof may be implemented in the context of the architecture and functionality of the embodiments described herein. The activity-based content object permissions recommendation technique 200 or any aspect thereof may be implemented in any environment.

FIG. 2 illustrates aspects pertaining to forming an activity-based permissions model from historical content object access activity to determine the content object access permissions recommendations. Specifically, the figure is presented to illustrate one embodiment of certain steps and/or operations performed over a network of devices (e.g., user devices, computing systems, etc.) to recommending access permissions for collaborative relationships that are automatically determined based at least in part on historical collaboration activity. As can be observed, the steps and/or operations can be grouped into a set of predictive model generation operations 210 and a set of permissions recommendation operations 220.

The predictive model generation operations 210 of activity-based content object permissions recommendation technique 200 commences by identifying a content management system that facilitates interactions over a plurality of user and a plurality of content objects (step 212). In such a content management system, the interactions are often governed by the access permissions assigned to the entities (e.g., users, content objects, etc.) associated with the collaborative relationships involved with the interactions. The interaction attributes of various user interaction events associated with the users and the content objects are recorded (step 214). The interaction attributes for a particular user-to-user interaction or user-to-content interaction might describe, for example, the entities (e.g., user identifiers, content object identifiers, etc.) associated with the interaction and any access permissions assigned to the entities and/or the relationship between the entities. The observed and recorded interaction attributes are then accessed to generate an activity-based permissions model (step 216). As earlier described, the activity-based permissions model might be a predictive model that consumes collaborative relationship attributes as inputs to predict a respective set of access permissions as outputs.

One embodiment of techniques for using the activity-based permissions model to determine such access permissions is described in the permissions recommendation operations 220 of activity-based content object permissions recommendation technique 200. Specifically, permissions recommendation operations 220 commences by identifying a collaborative relationship that is initiated by an invitor to have an invitee collaborate over a collaboration object (step 222). The collaboration attributes of the collaborative relationship are applied to the activity-based permissions model to determine a set of access permissions for the entities of the collaborative relationship (step 224). As merely one example, information characterizing the invitee, invitor, and collaboration object are applied to the activity-based permissions model to determine a set of access permissions that are to be assigned to the invitee to govern the invitee's access to the collaboration object. In some cases, the set of access permissions are presented to the invitor (step 226). For example, the access permissions might be presented as recommended permissions in a user interface that the invitor can accept, reject, or replace by one or more user selections at the user interface. In other cases, recommended access permissions can be assigned to content objects autonomously—without user intervention.

One embodiment of a system, data flows, and data structures for implementing activity-based content object permissions recommendation technique 200 and/or other herein disclosed techniques, is disclosed as follows.

Figure 3:
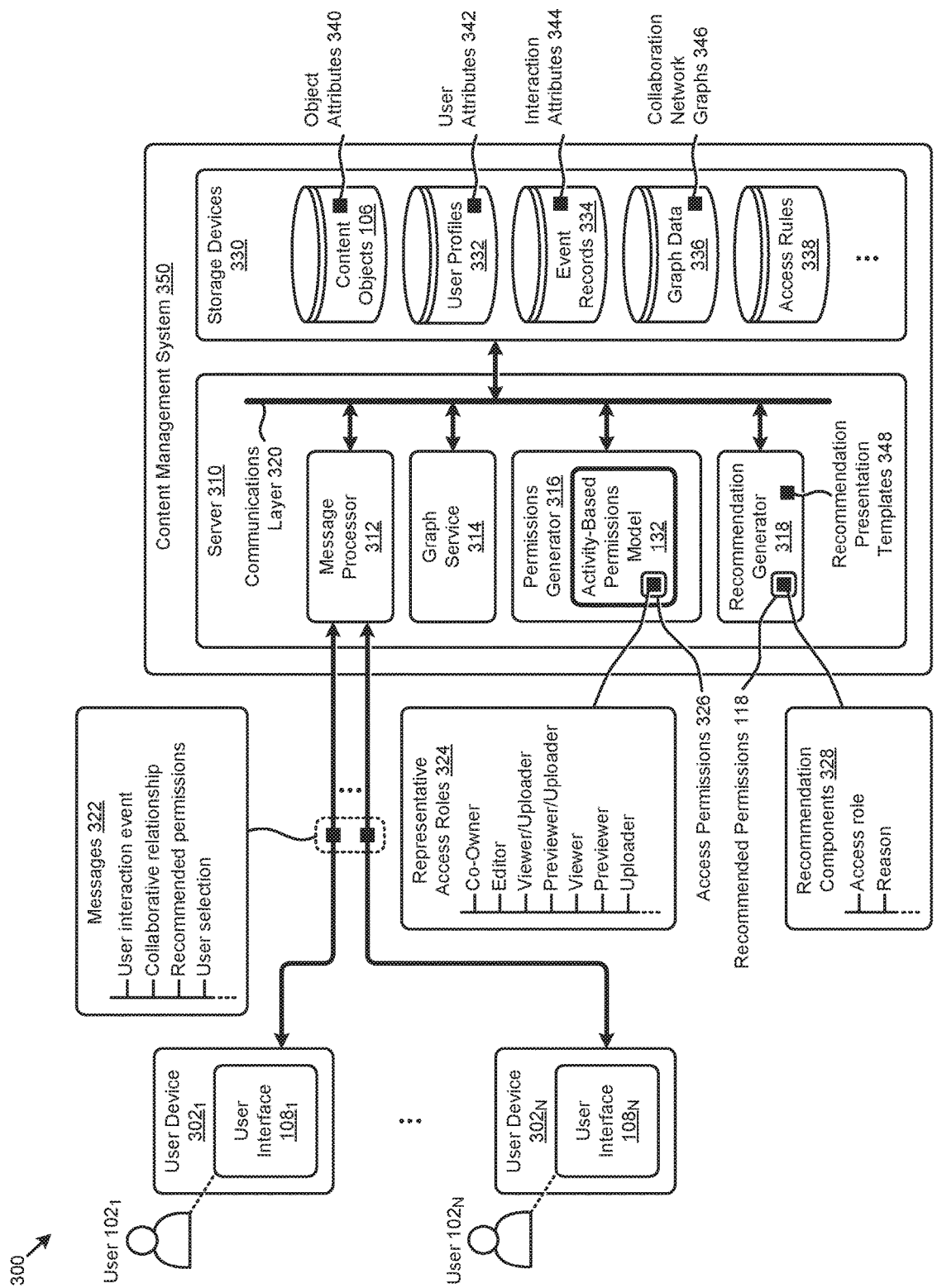
FIG. 3 is a block diagram of a system that implements activity-based content object access permissions generation, according to an embodiment.

FIG. 3 is a block diagram of a system 300 that implements activity-based content object access permissions generation. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to forming an activity-based permissions model from historical content object access activity to determine the content object access permissions recommendations. Specifically, the figure is being presented to show one embodiment of certain representative components and associated data structure and data flows implemented in a computing environment to facilitate the herein disclosed techniques. As shown, the components, data flows, and data structures are associated with a set of users (e.g., user $102_1$, . . . , user $102_N$) that interact with each other and a set of content objects 106 managed at a content management system 350. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of a server 310 operating at content management system 350. Server 310 comprises a message processor 312, a graph service 314, a permissions generator 316, which further comprises an instance of activity-based permissions model 132, and a recommendation generator 318. A plurality of instances of the foregoing components might operate at a plurality of instances of servers (e.g., server 310) at content management system 350 and/or any portion of system 300. Such instances can access each other (e.g., through a communications layer 320) and/or a set of storage devices 330 that store various information that facilitates the operation of the components of system 300 and/or any implementations of the herein disclosed techniques. For example, server 310 might facilitate access to shared content in content objects 106 by the users (e.g., user $102_1$, . . . , user $102_N$) from a respective set of user devices (e.g., user device $302_1$, . . . , user device $302_N$). The content objects (e.g., files, folders, etc.) in content objects 106 are characterized at least in part by a set of object attributes 340 (e.g., content object metadata) stored at storage devices 330. Furthermore, the users are characterized at least in part by a set of user attributes 342 stored in a set of user profiles 332 at storage devices 330.

The users interact with the user interfaces (e.g., user interface $108_1$, . . . , user interface $108_N$) of their user devices to send or receive various instances of messages 322 that are received or sent by message processor 312 at server 310. In some cases, certain agents or applications (e.g., a local content manager) operating at the user devices associated with the users might send or receive messages to or from server 310 without human interaction. One class of messages 322 correspond to user interaction events that are invoked by the users when they interact with one another and/or with various content objects as facilitated by content management system 350. For example, the users might log in to content management system 350 to interact with content objects that they own or that are shared with them, to invite other users to collaborate on content objects, and/or to perform other collaboration activities. Any of the foregoing interactions or collaboration activities can be characterized as user interaction events. As earlier mentioned, such user interaction events are governed by the access permissions assigned to the collaborative relationships (e.g., relationships between users, relationships between users and content objects, etc.) associated with the events.

The message processor 312 at server 310 monitors the messages 322 to detect the user interaction events performed by the plurality of users. Message processor 312 codifies certain interaction attributes 344 pertaining to the user interaction events in a set of event records 334 stored in storage devices 330. In some cases, message processor 312 will access user attributes 342 (e.g., user identifiers, etc.) stored in user profiles 332 and/or the object attributes 340 (e.g., content object identifiers, etc.) stored in content objects 106 to facilitate populating event records 334. The event records 334 and/or any other data described herein can be organized and/or stored using various techniques. For example, event records 334 might be organized and/or stored in a tabular structure (e.g., relational database table) that has rows that relate various interaction attributes with a particular user interaction event. As another example, the event data might be organized and/or stored in a programming code object that has instances corresponding to a particular user interaction event and properties that describe the various attributes associated with the event.

In the embodiment of depicted in FIG. 3, interaction attributes 344 of event records 334 and/or other information at content management system 350 are accessed by a graph service 314 to form instances of collaboration network graphs 346. A set of graph data 336 stored at storage devices 330 codify the attributes of collaboration network graphs 346. For example, graph data 336 codifies the entities (e.g., nodes) and entity relationships (e.g., edges) of the graphs and/or other entity attributes and entity relationship attributes (e.g., scores, weights, strengths, etc.) associated with the graphs. As used herein, the entity relationships of collaboration network graphs 346 correspond to collaborative relationships and the entities of collaboration network graphs 346 correspond to the users or content objects associated with those collaborative relationships.

When instances of messages 322 corresponding to collaborative relationships initiated by the users are received at message processor 312, the collaboration attributes associated with the collaborative relationships are forwarded to permissions generator 316. Permissions generator 316 applies the collaboration attributes to activity-based permissions model 132 to determine respective sets of access permissions 326 to assign to the collaborative relationships. In some cases, sets of access permissions 326 determined by activity-based permissions model 132 at permissions generator 316 might correspond to respective access roles. For example, as indicated by a set of representative access roles 324, access permissions 326 might correspond to a "co-owner" access role, an "editor" access role, a "viewer/uploader" access role, a "previewer/uploader" access role, a "viewer" access role, a "previewer" access role, an "uploader" access role, and/or other access roles.

Recommendation generator 318 receives the sets of access permissions from permissions generator 316 and constructs instances of recommended permissions 118 to deliver to the users. The recommended permissions 118 are delivered by recommendation generator 318 as instances of messages 322. As depicted in a set of recommendation components 328, recommended permissions 118 can comprise a recommended "access role", a "reason" or reason(s) for the recommendation, and/or other components. In some cases, recommendation generator 318 might select and populate a template from a set of recommendation presentation templates 348 to prepare recommended permissions 118 for presentation.

In response to viewing recommended permissions 118 in a user interface at a user device, a user may interact with the user interface to submit one or more user selections. For example, the user might submit a user selection (e.g., button click, dropdown select, etc.) that accepts, rejects, or replaces some or all of the set of access permissions that are presented as recommended permissions 118. Such user selections are received at message processor 312 as instances of messages 322, then forwarded to permissions generator 316 for processing.

User selections that accept a set of access permissions are processed to update a set of access rules 338 stored in storage devices 330 at content management system 350. A set of rules (e.g., rule base) such as access rules 338 or any other rules described herein, comprises data records storing various information that can be used to form one or more constraints to apply to certain functions and/or operations. For example, the information pertaining to a rule in the rule base might comprise conditional logic operands (e.g., input variables, conditions, constraints, etc.) and/or operators (e.g., "if", "then", "and", "or", "greater than", "less than", etc.) for forming a conditional logic statement that returns one or more results. More specifically, a set of access rules for a particular collaborative relationship might comprise conditional logic operands that identify the entities (e.g., users, content objects, etc.) that comprise the collaborative relationship and the access privileges and/or roles that govern the relationship.

The foregoing discussions include techniques for generating an activity-based permissions model based at least in part on various instances of user interaction events (e.g., step 216 of FIG. 2), which techniques are disclosed in further detail as follows.

Figure 4A:
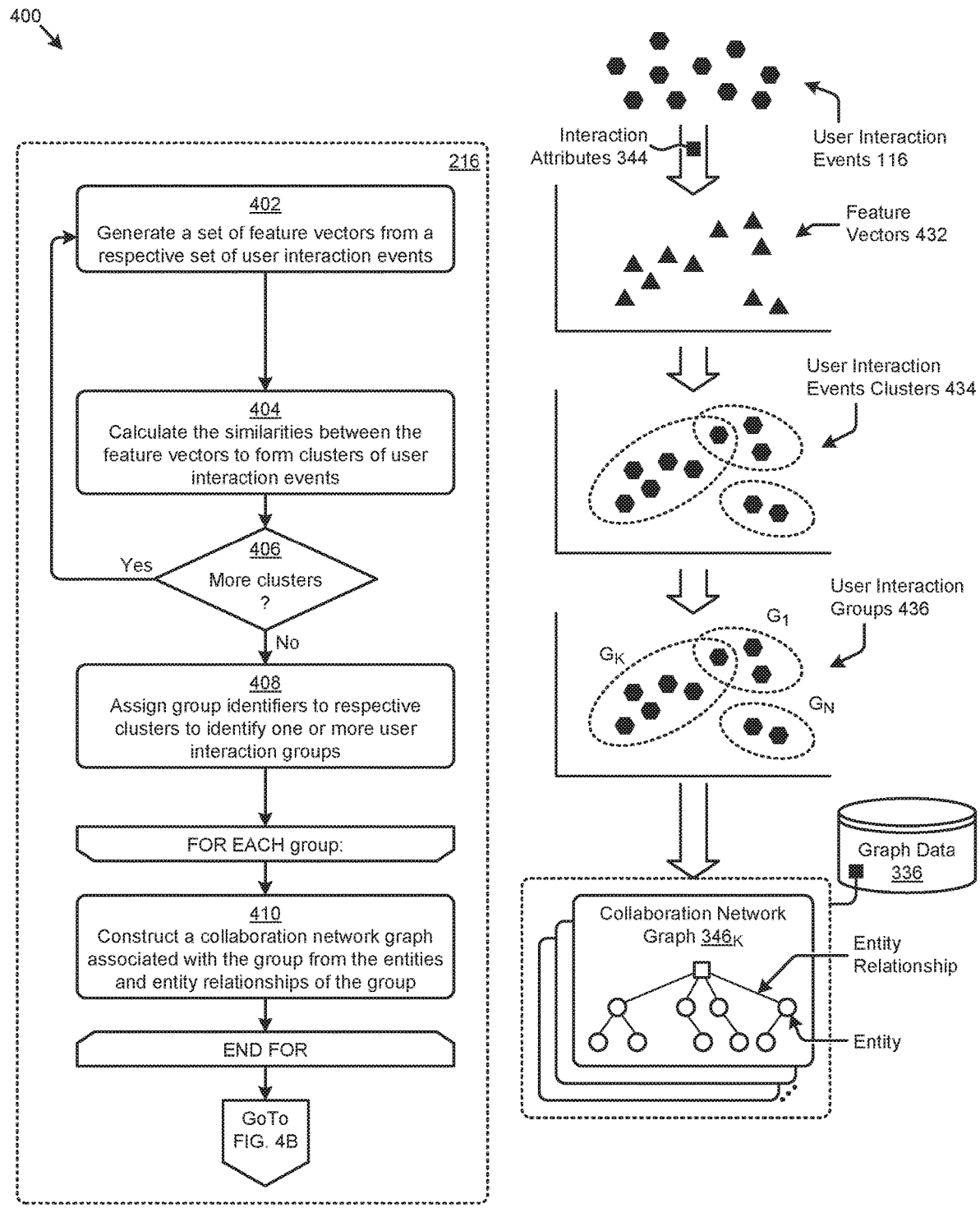
FIG. 4A and FIG. 4B depict an activity-based permissions model generation technique as used in systems that implement activity-based content object access permissions models, according to an embodiment.
Figure 4B:
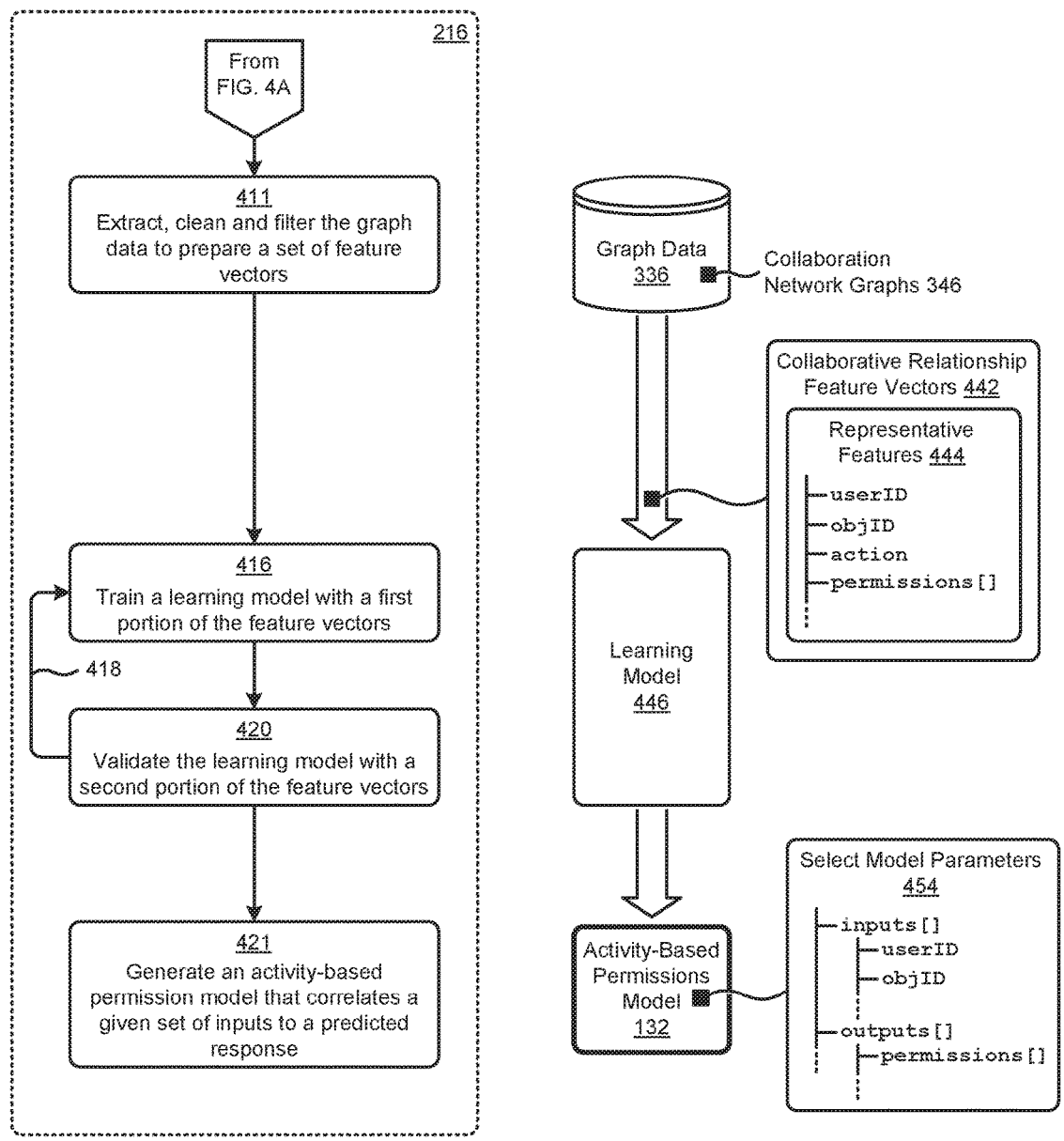

FIG. 4A and FIG. 4B depict an activity-based permissions model generation technique 400 as used in systems that implement activity-based content object access permissions models. As an option, one or more variations of activity-based permissions model generation technique 400 or any aspect thereof may be implemented in the context of the architecture and functionality of the embodiments described herein. The activity-based permissions model generation technique 400 or any aspect thereof may be implemented in any environment.

FIG. 4A and FIG. 4B illustrate aspects pertaining to forming an activity-based permissions model from historical content object access activity to determine the content object access permissions recommendations. Specifically, the figures are presented to illustrate one embodiment of certain steps and/or operations that facilitate generating an activity-based permissions model based at least in part on various instances of user interaction events. As depicted in the figures, the steps and/or operations are associated with step 216 of FIG. 2. A representative scenario is also shown in the figures to illustrate an example application of secure container setup technique 400.

The portion of activity-based permissions model generation technique 400 shown in FIG. 4A commences by generating a set of feature vectors from a respective set of user interaction events (step 402). As illustrated, for example, a set of feature vectors 432 might be formed from the user interaction events 116. More specifically, each one of the feature vectors 432 will correspond to a respective one of the user interaction events 116 and comprise a respective portion of the interaction attributes 344 associated with the particular event. The portion of the interaction attributes 344 serve as the "features" of feature vectors 432. Such features might include one or more user identifiers, one or more content object identifiers, a timestamp, and/or other user interaction event attributes.

Similarities between the feature vectors are calculated to form one or more clusters of user interaction events (step 404). For example, a set of user interaction event clusters 434 can be formed from feature vectors 432. Any known machine learning techniques and/or clustering techniques can be applied to the feature vectors to form the clusters. The illustrated scenario indicates that the clusters can overlap (e.g., share one or more common features, feature vectors, or underlying user interaction events).

In some cases (e.g., when more computing resources and/or time are available), the generation of more clusters might be performed ("Yes" path of decision 406). Such additional clusters might be generated from an additional set of user interaction events (e.g., from an earlier historical period) or from a re-application of a clustering technique (e.g., a different clustering technique, the same clustering technique with different constraints, etc.).

Further details regarding general approaches to forming and maintaining clusters are described in U.S. application Ser. No. 16/051,447 titled "SPONTANEOUS NETWORKING", filed on Jul. 31, 2018, which is hereby incorporated by reference in its entirety.

The one or more clusters of user interaction events are assigned group identifiers to identify a respective one or more user interaction groups (step 408). As shown, the user interaction event clusters 434 are assigned group identifiers (e.g., "$G_K$", "$G_1$", and "$G_N$") to identify a respective set of user interaction groups 436. For each of the user interaction groups, a collaboration network graph that corresponds to its respective group is constructed (step 410). The collaboration network graph characterizes the entities and entity relationships that comprise the interaction event group. For example, collaboration network graph $346_K$ might correspond to interaction group $G_K$ and characterize the users and collaborative relationships between various users and content objects that constitute interaction group $G_K$. As illustrated, the collaboration network graphs for each user interaction group can be codified in graph data 336.

Referring to FIG. 4B, activity-based permissions model generation technique 400 accesses a set of collaboration network graphs that are derived from various historical user interaction events. In the shown scenario, at least a portion of the collaboration network graphs 346 from graph data 336 are accessed using a set of APIs.

Further details regarding general approaches for retrieving data from collaboration network graphs are described in U.S. application Ser. No. 16/154,679 titled "ON-DEMAND COLLABORATION USER INTERFACES", filed on Oct. 8, 2018, which is hereby incorporated by reference in its entirety.

At step 411, the collaboration network graphs are analyzed to extract, clean and filter a set of feature vectors taken from the graphs. More specifically, instances of collaborative relationship feature vectors 442 that describe the entities and entity relationships of collaboration network graphs 346 are extracted from the graph data, normalized with respect to time, and filtered to consider only vectors that include certain collaborative relationship features.

As indicated by the shown set of representative features 444, such collaborative relationship features might describe a user identifier (e.g., stored in a "userID" field), a content object identifier (e.g., stored in an "objID" field), a collaboration action (e.g., stored in an "action" field), a set of access permissions associated with the collaborative relationship (e.g., stored in a "permissions [ ]" object), and/or other collaborative relationship properties or characteristics.

The collaborative relationship feature vectors are then used to form and train a learning model 446. Specifically, the extracted, cleaned and filtered collaborative relationship feature vectors are prepared for input into the learning model. Then, a first portion of the collaborative relationship feature vectors 442 are used to train the learning model (step 416). A second (e.g., different) portion of the feature vectors are used to validate the learning model (step 420). Both the first portion and the second portion can be selected using any known techniques. For example, the first portion might be selected using a random sample of the full corpus of vectors. As another example, the size of the first portion might be determined initially based on a percentage (e.g., 20%) and then re-determined based on one or more overfitting thresholds.

The process of training and validating can be iterated (path 418) until the learning model behaves within target tolerances (e.g., with respect to predictive statistic metrics, descriptive statistics, significance tests, precision, recall, etc.). In some cases, additional feature vectors can be retrieved (e.g., from collaboration network graphs 346) to further train the learning model.

Once a learning model is initially formed, then at any point in the training and validation processes any combinations or variations of techniques can be applied to improve the accuracy of the learning model. For example, the model can be enhanced through supervised learning, where certain of the vectors are labeled. As another example, unsupervised learning can take place by tuning the features based on observance of detected errors and application of error correction techniques. In some cases, semi-supervised learning can be carried out by using a combination of labeling and error corrections.

In some situations, simulations are run to apply various combinations of collaborative relationship features to the learning model to generate predicted responses to the varying stimuli. As such, varied instances of feature combinations might be applied with other unvaried stimuli to the learning model. By simulating certain sets (e.g., combinations of varied stimuli), an improved learning model can be generated. Specifically, by simulating certain sets of feature variations, and by tuning coefficients a learning model can be tuned for sensitivity to cover the full range of collaborative relationship feature variations that might be observed in a highly collaborative content management system.

In some cases, model parameters (e.g., coefficients, weights, etc.) that are used to form an activity-based permissions model (step 421) are determined based at least in part on the learning model. In many cases, the activity-based permissions model is smaller than the learning model on which it is based. For example, the activity-based permissions model might be based on only certain feature vectors of the learning model or might be based on only some features of the feature vectors the learning model. In some cases, activity-based permissions model is optimized for high performance. In some cases, only some subset of model parameters 454 are selected for inclusion in the activity-based permissions model.

For example, and as depicted in the shown set of select model parameters 454, a selected set of model parameters associated with activity-based permissions model 132 might associate entities (e.g., identified by a "userID" field and an "objID" field stored in an "input [ ]" object) with access permissions (e.g., described in a "permissions [ ]" object included in an "output [ ]" object). The values of the parameters might be based on frequency of observed activities and, as such, the existence and/or strength of the associations between an entity (e.g., a user) and sets of access permissions derive from respective observed activities. More specifically, a first user might have been observed to frequently create and/or edit content, whereas a second user might have been observed to frequently view the same content (and rarely or never edit the content). In this case, the first user (e.g., a first invitee) might be provisioned "editor" permissions for a document and the second user (e.g., a second invitee) might be provisioned "previewer" permissions for the same document.

The possible associations between a particular user and sets of permissions can become large. Accordingly, various models and user interfaces have been designed to aid a first user (e.g., an invitor) in selecting such content object access permissions for a second user (e.g., an invitee). As shown in computing environment 100, user u5, acting as an invitor, interacts with a user interface 108₁ to specify a collaborative relationship 110.

Further details pertaining to techniques for applying the attributes of a collaborative relationship to the aforementioned activity-based permissions model to determine a set of access permissions for the collaborative relationship (e.g., step 224 of FIG. 2) are disclosed as follows.

Figure 5:
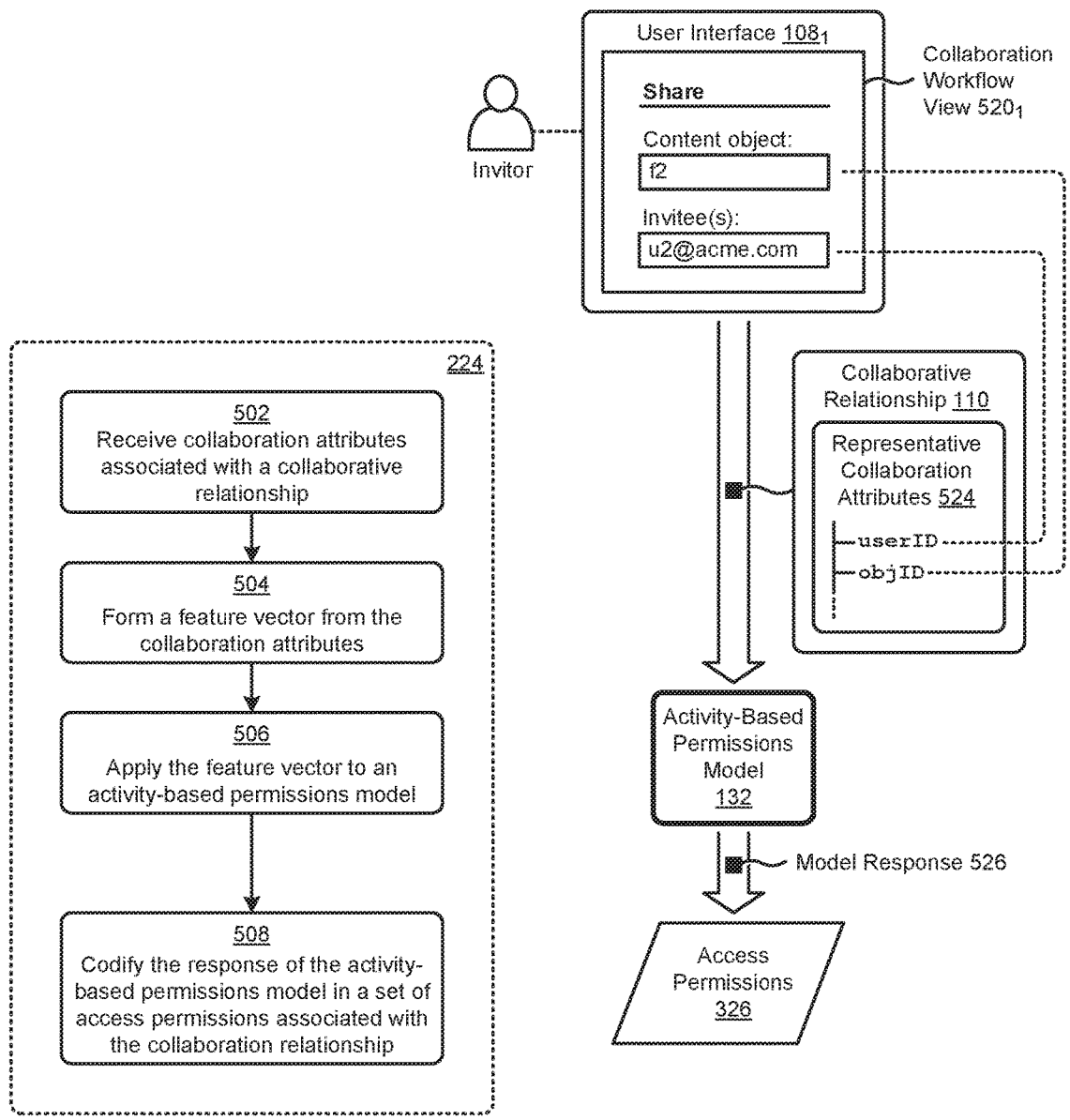
FIG. 5 presents a permissions recommendation selection technique as implemented in systems that facilitate automatic activity-based content object access permissions generation, according to an embodiment.

FIG. 5 presents a permissions recommendation selection technique 500 as implemented in systems that facilitate automatic activity-based content object access permissions generation. As an option, one or more variations of permissions recommendation selection technique 500 or any aspect thereof may be implemented in the context of the architecture and functionality of the embodiments described herein. The permissions recommendation selection technique 500 or any aspect thereof may be implemented in any environment.

FIG. 5 illustrates aspects pertaining to forming an activity-based permissions model from historical content object access activity to determine the content object access permissions recommendations. Specifically, the figure is presented to illustrate one embodiment of certain steps and/or operations for applying the attributes of a collaborative relationship to an activity-based permissions model to determine a set of access permissions for the collaborative relationship. As depicted in the figure, the steps and/or operations are associated with step 224 of FIG. 2. A representative scenario is also shown in the figure to illustrate an example application of permissions recommendation selection technique 500.

Permissions recommendation selection technique 500 commences by receiving the collaboration attributes associated with a collaborative relationship (step 502). For example, a collaborative relationship 110 might be initiated by an invitor at user interface $108_1$. Specifically, the invitor might interact with a collaboration workflow view $520_1$ to invite user u2 to collaborate over file f2. As depicted in a set of representative collaboration attributes 524, the attributes of collaborative relationship 110 might comprise a user identifier (e.g., u2@acme.com) stored in a "userID" field, a content object identifier (e.g., "f2") stored in an "objID" field, and/or other attributes.

A feature vector is formed from the collaboration attributes (step 504) and applied to an activity-based permissions model 132 (step 506). The response from applying the feature vector to the model is codified in a set of access permissions that are associated with the collaborative relationship (step 508). As an example, access permissions 326 are derived from a model response 526 produced by activity-based permissions model 132 in response to consuming a feature vector formed from the attributes of collaborative relationship 110.

The foregoing discussions describe techniques for presenting (e.g., as recommended permissions) the access permissions identified by the activity-based permissions model (e.g., step 226 of FIG. 2), which techniques are disclosed in further detail as follows.

Figure 6:
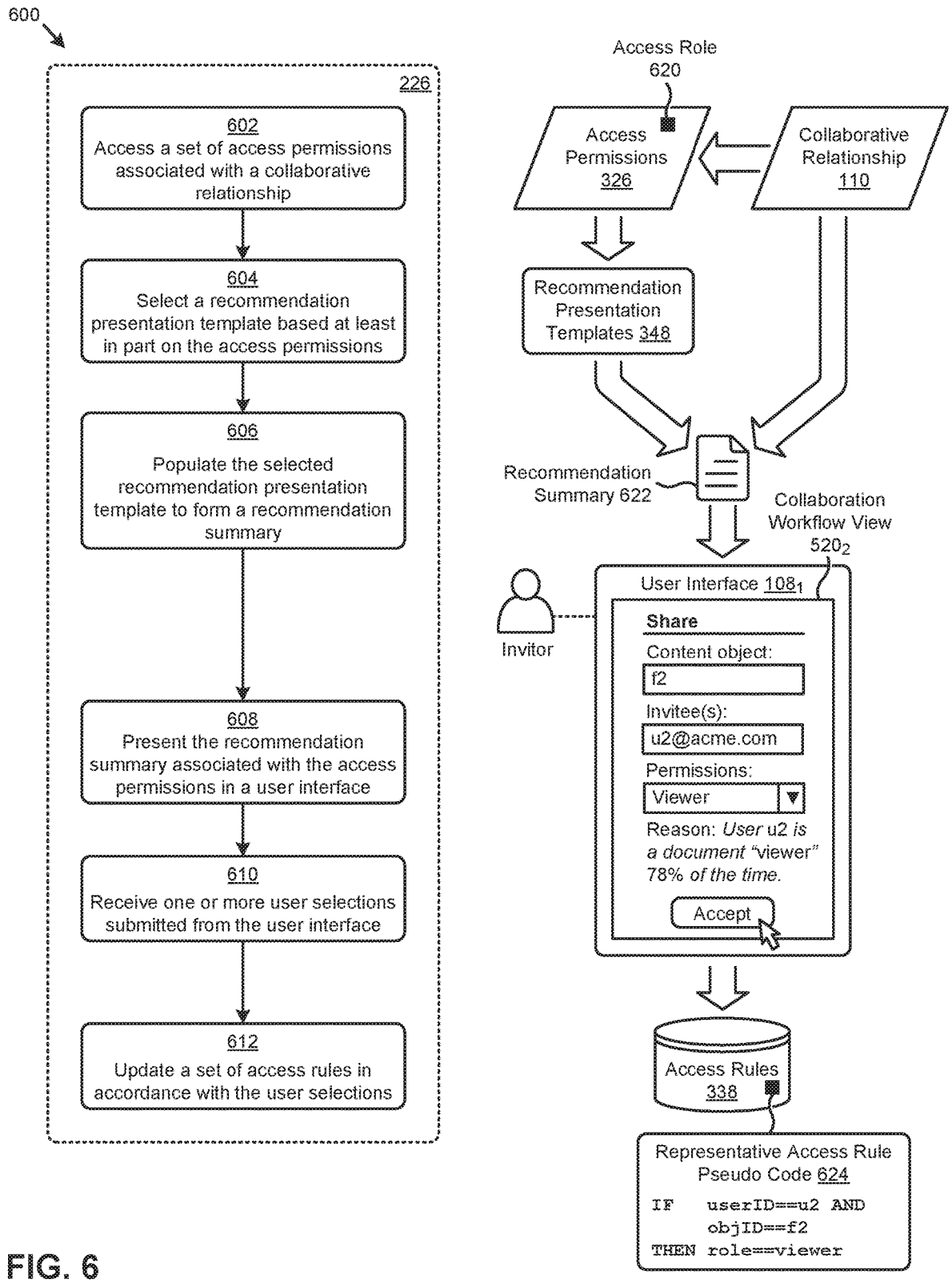
FIG. 6 presents a permissions recommendation presentation technique as implemented in systems that facilitate automatic activity-based content object access permissions generation, according to an embodiment.

FIG. 6 presents a permissions recommendation presentation technique 600 as implemented in systems that facilitate automatic activity-based content object access permissions generation. As an option, one or more variations of permissions recommendation presentation technique 600 or any aspect thereof may be implemented in the context of the architecture and functionality of the embodiments described herein. The permissions recommendation presentation technique 600 or any aspect thereof may be implemented in any environment.

FIG. 6 illustrates aspects pertaining to forming an activity-based permissions model from historical content object access activity to determine the content object access permissions recommendations. Specifically, the figure is presented to illustrate one embodiment of certain steps and/or operations for presenting (e.g., as recommended permissions) the access permissions produced by the activity-based permissions model. As depicted in the figure, the steps and/or operations are associated with step 226 of FIG. 2. A representative scenario is also shown in the figure to illustrate an example application of permissions recommendation presentation technique 600.

Permissions recommendation presentation technique 600 commences by accessing a set of access permissions associated with a collaborative relationship (step 602). In the shown scenario, the set of access permissions might be access permissions 326 that correspond to collaborative relationship 110. As can be observed, access permissions 326 at least identifies an access role 620 to be applied to collaborative relationship 110.

The access permissions are consulted to select a recommendation summary template (step 604). For example, the access role 620 (e.g., "viewer") specified in access permissions 326 might result in the selection of a certain template from recommendation presentation templates 348. The selected template is then populated to form a recommendation summary (step 606). As shown, a recommendation summary 622 might be formed based at least in part on information associated with access permissions 326, collaborative relationship 110, and/or other information sources (e.g., graph data, event records, user profiles, etc.).

The recommendation summary associated with the access permissions and other information are then presented at a user interface (step 608). As depicted in collaboration workflow view $520_2$ at user interface $108_1$, an invitor who initiated the collaborative relationship 110 can view the entities (e.g., file f2 and user u2) associated with the relationship and the recommended access role (e.g., "viewer") as determined by the herein disclosed techniques. As can be observed, a "reason" for the recommendation is also presented. In this case, at least one reason that supports the recommended access role of "viewer" pertains to the fact that user u2 has a permissions distribution that indicates user u2 is assigned the role of "viewer" for 78 percent of collaborative relationships involving user u2.

For certain collaboration workflows, a user (e.g., invitor) might be expected to respond to the access permissions presented at the user interface. For example, the user might be expected to accept, reject, or replace (e.g., select different permissions) the presented access permissions. In collaboration workflow view $520_2$, for example, the invitor can submit one or more user selections using the "Accept" button, the "Permissions" dropdown selector, and/or other web interface components. Any user selections submitted from the user interface are received (step 610) and a set of access rules are updated in accordance with the user selections (step 612). As merely one scenario, if the invitor clicks the "Accept" button of collaboration workflow view $520_2$, access rules 338 will be updated to assign a "viewer" access role to user u2 when accessing file f2. More specifically, as depicted in a set of representative access rule pseudo code 624, access rules 338 allows merely "viewer" access to content object "f2" by user "u2".

ADDITIONAL EMBODIMENTS OF THE DISCLOSURE

Additional Practical Application Examples

Figure 7:
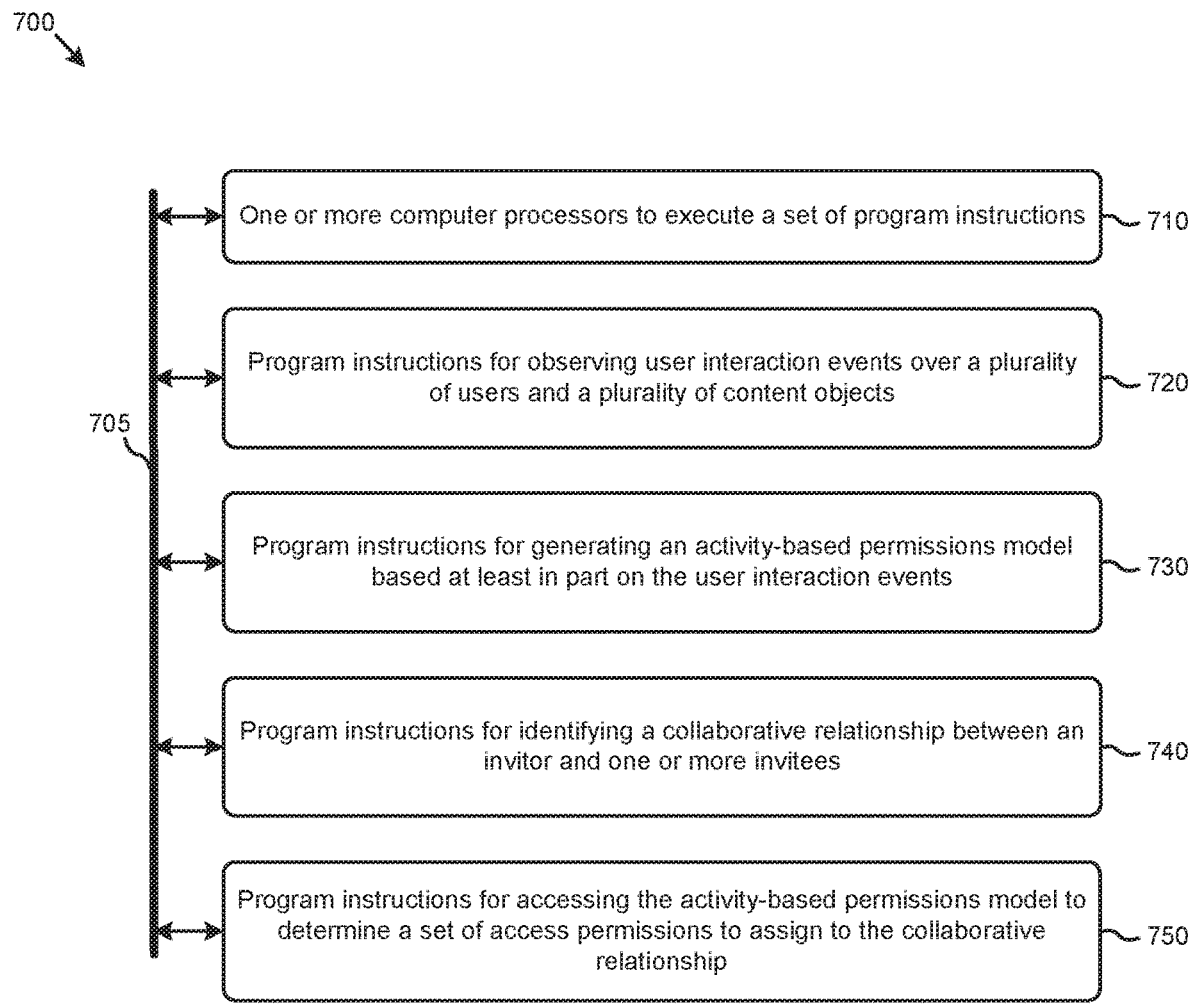
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually or as combined, serve to form improved technological processes that address assigning fine-grained (e.g., user-specific) access permissions to shared content objects. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with any other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: observing user interaction events over a plurality of users and a plurality of content objects (module 720); generating an activity-based permissions model based at least in part on the user interaction events (module 730); identifying a collaborative relationship between an invitor and one or more invitees (module 740); and accessing the activity-based permissions model to determine a set of access permissions to assign to the collaborative relationship (module 750).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 8A:
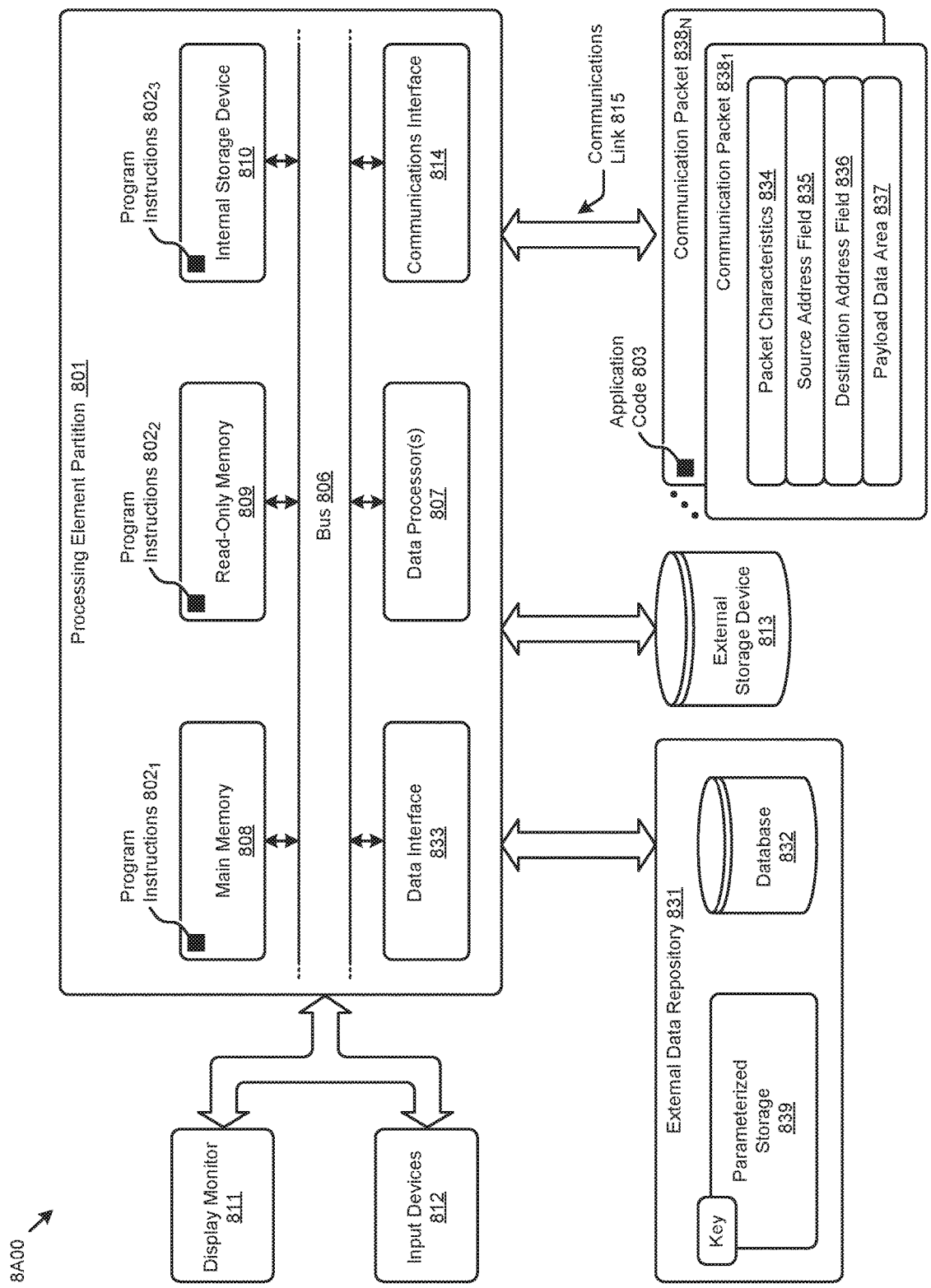
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $838_1$, communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics when determining activity-based content object access permissions. A module may include one or more state machines and/or combinational logic used to implement or facilitate the operational and/or performance characteristics pertaining to determining activity-based content object access permissions.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of activity-based content object access permissions). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to activity-based content object access permissions, and/or for improving the way data is manipulated when performing computerized operations pertaining to forming an activity-based permissions model from historical content object access activity to determine the content object access permissions recommendations.

Figure 8B:
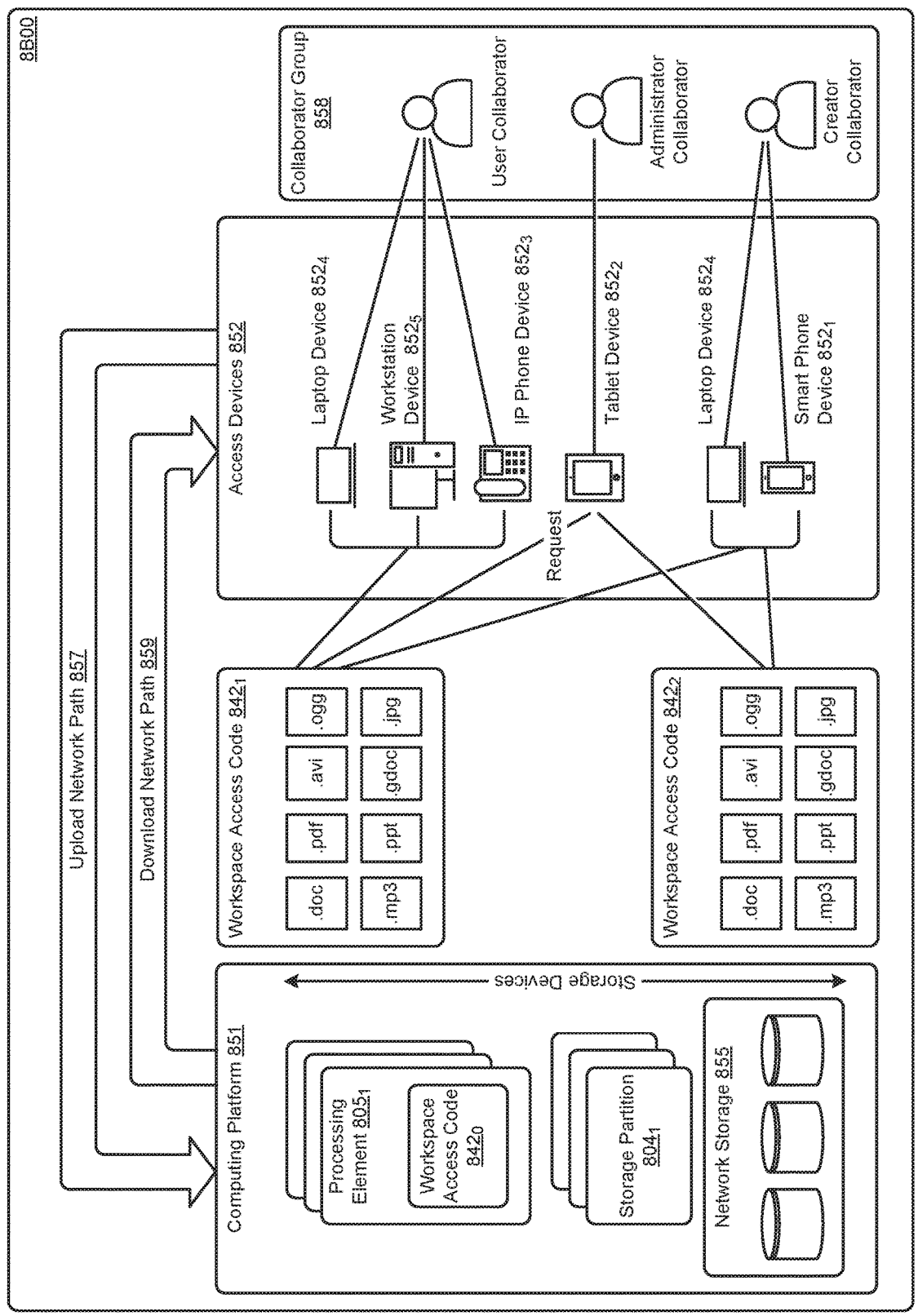

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of access devices 852 (e.g., laptop device $852_4$, workstation device $852_5$, IP phone device $852_3$, tablet device $852_2$, smart phone device $852_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for recommending activity-based content object access permissions to a collaboration object, the method comprising:
analyzing user interaction events over a plurality of users and a plurality of content objects;
generating an activity-based permissions model based at least in part on a result of analyzing the user interaction events;
receiving, from an inviter, a request for initiating a collaborative relationship between the inviter and a plurality of invitees, wherein the inviter initiates the collaborative relationship by inviting the plurality of invitees to collaborate on a content object of the plurality of content objects; and after receiving the request for initiating collaborative relationship, performing a set of actions for the request, the set of actions comprising:
  analyzing, by the activity-based permissions model, activity attributes of the user interaction events and a new attribute of the collaborative relationship to determine a first access role and a first access permission for a first invitee as well as a second access role and a second access permission for a second invitee of the plurality of invitees; and
  assigning at least the first and second access roles and the first and second access permissions to the collaborative relationship for the plurality of invitees to collaborate on the content object with respective access permissions, wherein the first and second access permissions respectively allow for different types of access to the content object.

2. The method of claim 1, further comprising:
presenting at least a portion of the respective access permissions to the inviter.

3. The method of claim 2, further comprising:
receiving a selection that accepts, rejects, or replaces the portion of the respective access permissions.

4. The method of claim 1, further comprising:
accessing at least a portion of the respective access permissions that govern how the plurality of invitees respectively accesses the content object, wherein first access permission for the first invitee comprises a read access permission and at least one of an edit, modify, or delete access permission specific to the content object.

5. The method of claim 1, further comprising:
forming a recommendation summary associated with the respective access permissions; and
presenting at least a portion of the recommendation summary to the inviter.

6. The method of claim 1, wherein the user interaction events are described by one or more interaction attributes.

7. The method of claim 6, wherein the activity-based permissions model is generated based at least in part on the one or more interaction attributes.

8. The method of claim 1, wherein the collaborative relationship is described by collaboration attributes.

9. The method of claim 8, wherein the respective access permissions are determined at least by applying at least a portion of the collaboration attributes to the activity-based permissions model.

10. The method of claim 1, wherein the inviter is from the plurality of users, the plurality of invitees are from the plurality of users, or the content object is from the plurality of content objects.

11. A non-transitory computer readable medium having stored thereon a sequence of instructions which, when stored in memory and executed by one or more processors causes the one or more processors to perform a set of acts for recommending activity-based content object access permissions to a collaboration object, the set of acts comprising:
  analyzing user interaction events over a plurality of users and at least one content object;
  generating an activity-based permissions model based at least in part on a result of analyzing the user interaction events over the at least one content object;
  receiving, from an inviter, a request for initiating a collaborative relationship between the inviter and a plurality of invitees, wherein the inviter initiates the collaborative relationship by inviting the plurality of invitees to collaborate on the at least content object of a plurality of content objects; and
  after receiving the request for initiating the collaborative relationship, performing a set of actions for the request, the set of actions comprising:
    analyzing, by the activity-based permissions model, activity attributes of the user interaction events and a new attribute of the collaborative relationship to determine a first access role and a first access permission for a first invitee as well as a second access role and a second access permission for a second invitee of the plurality of invitees; and
    assigning at least the first and second access roles and the first and second access permissions to the collaborative relationship for the plurality of invitees to collaborate on the at least one content object with respective access permissions, wherein the first and second access permissions respectively allow for different types of access to the content object.

12. The non-transitory computer readable medium of claim 11, further comprising instructions which, when stored in memory and executed by the one or more processors causes the one or more processors to perform acts of:
presenting at least a portion of the respective access permissions to the inviter as recommendations.

13. The non-transitory computer readable medium of claim 12, further comprising instructions which, when stored in memory and executed by the one or more processors causes the one or more processors to perform acts of:
receiving a selection that accepts, rejects, or replaces previously accepted access permissions.

14. The non-transitory computer readable medium of claim 11, further comprising instructions which, when stored in memory and executed by the one or more processors causes the one or more processors to perform acts of:
accessing at least a portion of the respective access permissions that govern how the plurality of invitees respectively accesses the content object, wherein first access permission for the first invitee comprises a read access permission and at least one of an edit, modify, or delete access permission specific to the content object.

15. The non-transitory computer readable medium of claim 11, further comprising instructions which, when stored in memory and executed by the one or more processors causes the one or more processors to perform acts of:
forming a recommendation summary associated with the respective access permissions; and
presenting at least a portion of the recommendation summary to the inviter.

16. The non-transitory computer readable medium of claim 11, wherein the user interaction events are described by one or more interaction attributes that describe at least one of one or more user identifiers, one or more content object identifiers, or a timestamp.

17. The non-transitory computer readable medium of claim 16, wherein the activity-based permissions model is generated based at least in part on the one or more interaction attributes.

18. The non-transitory computer readable medium of claim 11, wherein the collaborative relationship is described by collaboration attributes.

19. A system for recommending activity-based content object access permissions to a collaboration object, the system comprising:
  a non-transitory storage medium having stored thereon a sequence of instructions; and
  one or more processors that execute the sequence of instructions to cause the one or more processors to perform a set of acts, the set of acts comprising, analyzing user interaction events over a plurality of users and at least one content object;

generating an activity-based permissions model based at least in part on a result of analyzing the user interaction events over the at least one content object;

receiving, from an inviter, a request for initiating a collaborative relationship between an inviter and a plurality of invitees, wherein the inviter initiates the collaborative relationship by inviting the plurality of invitees to collaborate on the at least one content object of a plurality of content objects; and after receiving the request for initiating the collaborative relationship, performing a set of actions for the request, the set of actions comprising:

analyzing, by the activity-based permissions model, activity attributes of the user interaction events and a new attribute of the collaborative relationship to determine a first access role and a first access permission for a first invitee as well as a second access role and a second access permission for a second invitee of the plurality of invitees; and assigning at least the first and second access roles and the first and second access permissions to the collaborative relationship for the plurality of invitees to collaborate on the content object, wherein the first and second access permissions respectively allow for different types of access to the content object.

20. The system of claim 19, wherein the user interaction events are described by one or more interaction attributes that describe at least one of one or more user identifiers, one or more content object identifiers, or a timestamp.

* * * * *